(12) United States Patent
Myong

(10) Patent No.: US 6,456,476 B1
(45) Date of Patent: Sep. 24, 2002

(54) CIRCUIT PROTECTION RELAY HAVING BIMETAL WIPER

(75) Inventor: Inho Myong, Newark, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/547,134

(22) Filed: Apr. 7, 2000

Related U.S. Application Data

(63) Continuation of application No. 09/358,148, filed on Jul. 19, 1999, now abandoned, which is a continuation of application No. 09/156,933, filed on Sep. 18, 1998, now abandoned, which is a continuation of application No. 08/682,067, filed on Jul. 16, 1996, now abandoned.

(51) Int. Cl.$^7$ ................................................. H02H 5/04
(52) U.S. Cl. ...................................... 361/103; 361/105
(58) Field of Search ................................ 361/93.1, 115, 361/103, 104, 105, 106, 23, 24, 31–34, 93.8; 337/12.16; 338/22 R

(56) References Cited

U.S. PATENT DOCUMENTS 2,376,658 A    5/1945   Charbonneau et al. ...... 175/294

(List continued on next page.)

FOREIGN PATENT DOCUMENTS

| CH | 549 282 | 5/1974 | .......... H01H/83/14 |
|---|---|---|---|
| DE | 120 564 | 6/1976 | .......... H01H/61/01 |
| DE | 29 35 807 A1 | 4/1981 | ............ H02H/3/08 |
| DE | 43 00 909 A1 | 7/1994 | .......... H01H/37/52 |
| EP | 0 661 790 A2 | 7/1995 | ............ H02H/9/02 |
| EP | 0 829 939 A2 | 3/1998 | ............ H02H/3/08 |
| FR | 2 294 538 | 7/1976 | .......... H01H/73/48 |
| FR | 2 653 593 | 4/1991 | .......... H01H/51/08 |
| GB | 564 822 | 10/1944 | |
| GB | 1 309 819 | 3/1973 | ............ H02H/3/08 |
| GB | 2 020 904 | 11/1979 | .......... H01H/51/34 |
| GB | 2 047 487 A | 11/1980 | ............ H05B/3/18 |
| GB | 2 056 204 A | 3/1981 | ............ H02H/5/04 |
| GB | 2 236 018 A | 3/1991 | .......... H01H/61/01 |
| JP | 64 19647 | 1/1989 | .......... H01H/61/01 |
| JP | 3 147224 | 6/1991 | .......... H01H/61/01 |
| JP | 9 308077 | 11/1997 | ............ H02H/3/08 |
| SU | 1501190 A1 | 8/1989 | .......... H01H/71/16 |
| SU | 1742926 | 6/1992 | ............ H02H/3/08 |

*Primary Examiner*—Kim H. Huynh

(57) ABSTRACT

An electrical protection device for protecting an operating circuit from overcurrent and having relay contacts in series between an electrical power supply and an electrical power load and having a relay coil in parallel across the electrical power supply in an on state. The protection device includes a single relay package having a frame, the relay coil, an armature mechanically actuated from a normally closed contact position to a normally open contact position when the coil is energized, a bimetallic wiper mounted to the armature, a wiper contact mounted to the bimetallic wiper and a normally open contact, a diode connected in series with the relay coil and the normally open contact to pass coil energizing current to the coil from the electrical power supply during the on state and to prevent backflow of coil energizing current to reach the electrical power load when power is first applied to the coil, a first coil lead connected to the relay coil and a second coil lead connected to an anode of the diode, a first contact lead connected to the wiper contact, and a second contact lead connected to the normally open contact. In the on state the relay coil is connected to the electrical power supply through the diode and causes the wiper contact to connect to the normally open contact to connect the supply to the load through the first contact lead and the second contact lead. In the off state the bimetallic wiper responds to an overcurrent in the power supply path by changing shape and moving the wiper contact out of connection with the normally open contact thereby disconnecting the load from the supply.

8 Claims, 3 Drawing Sheets

U.S. PATENT DOCUMENTS

| | | | |
|---|---|---|---|
| 2,980,779 A | 4/1961 | Hickle et al. | 200/113 |
| 3,209,206 A | 9/1965 | Courtin | 317/41 |
| 3,840,834 A | 10/1974 | Obenhaus et al. | 337/79 |
| 3,846,674 A | 11/1974 | McNulty | 317/13 C |
| 3,950,741 A | 4/1976 | Schroeder | 340/251 |
| 4,019,097 A | 4/1977 | Miller et al. | 316/93 |
| 4,237,508 A | 12/1980 | Woods et al. | 361/24 |
| 4,319,299 A | 3/1982 | Woods et al. | 361/24 |
| 4,450,496 A | 5/1984 | Doljack et al. | 361/58 |
| 4,518,850 A | 5/1985 | Grasso | 219/505 |
| 4,574,229 A | 3/1986 | Kim | 318/788 |
| 4,635,020 A | 1/1987 | Sako | 337/49 |
| 4,677,281 A | 6/1987 | Mills | 219/505 |
| 4,682,133 A * | 7/1987 | Kern | 335/128 |
| 4,780,598 A | 10/1988 | Fahey et al. | 219/511 |
| 4,785,274 A | 11/1988 | Sako et al. | 337/49 |
| 4,808,961 A | 2/1989 | Sako et al. | 337/49 |
| 4,827,232 A * | 5/1989 | Minks | 335/78 |
| 4,908,594 A | 3/1990 | Akiike et al. | 337/49 |
| 5,264,766 A | 11/1993 | Tracht et al. | 318/443 |
| 5,296,996 A | 3/1994 | Hansson et al. | 361/24 |
| 5,590,010 A | 12/1996 | Ceola et al. | 361/93 |
| 5,737,160 A | 4/1998 | Duffy | 361/3 |

* cited by examiner

CIRCUIT PROTECTION RELAY HAVING BIMETAL WIPER

RELATED APPLICATIONS

This is a continuation of U.S. patent application Ser. No. 09/358,148, now abandoned, filed Jul. 19, 1999, which is a continuation of U.S. patent application No. Ser. 09/156,933, filed on Sep. 18, 1998, now abandoned, which is a continuation of U.S. patent application Ser. No. 08/682,067, filed on Jul. 16, 1996, now abandoned, the disclosures of which are incorporated herein by reference.

BACKGROUND OF THE INVENTION

1. Field of the Invention

This invention relates to electrical circuit overcurrent protection.

2. Introduction to the Invention

Positive temperature coefficient (PTC) circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tipped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times at 20° C. For any individual device, the pass current and the trip current are the same. However, in this specification, reference is made to a PTC device having an $I_{PASS}$ and a different $I_{TRIP}$, because as a practical matter, the manufacturer of an electrical switch must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

A limitation on the known uses of PTC protection devices is that when a PTC device is placed in series with the load and sized to conduct the normal circuit current, the PTC device can take a relatively long time to convert to its tripped state on an overcurrent which is, e.g., up to a few times the normal circuit current.

SUMMARY OF THE INVENTION

The invention provides a new overcurrent protection system which will give a rapid response to even relatively small overcurrents. In the new system, a sensor element and circuit interruption element are placed in series with the load. The sensor element is functionally linked to the circuit interruption element via a control element, so that, when the current in the circuit exceeds a predetermined amount, the sensor element senses the overcurrent and communicates with the control element. The control element causes the circuit interruption element to change from a relatively conductive normal state to a relatively non-conductive fault state (including a completely open state). The invention also provides a new relay assembly which is useful in circuit protection arrangements including circuit protection arrangements of the invention. The new relay assembly, comprises a wiper and an electrical contact. When the wiper is in contact with the relay contact, thereby making a connection, the wiper will open the connection when a current through the connection exceeds a predetermined current amount.

In an example of a preferred embodiment of the invention, the functions of the sensor element and circuit interruption element are combined in a sensor-interrupt element and are provided by a relay having a new bimetal wiper which, itself, is an aspect of the invention. When the relay is energized, the bimetal wiper of the relay is placed in series with the parallel combination of the load and the control element. When an overcurrent passes through such a system, the bimetal wiper disengages from the relay contact thereby breaking the circuit to the load and the control element. The control element causes the sensor-interrupt element to latch open in the fault state.

In an aspect, the invention provides a relay assembly which will open a connection when a current through the connection exceeds a predetermined current amount. The relay assembly comprises a wiper and a relay contact, the wiper being (i) in a first position in which it is in contact with the relay contact, thereby making the connection, or (ii) in a second position in which it is separate from the relay contact, and the wiper moving from the first position to the second position, thereby breaking the connection, when a current through the wiper exceeds the predetermined current amount.

It will be apparent that in the preferred embodiments, this invention permits the use of bimetal switches to be arranged with mechanical switches and other electrical devices to provide reliable protection which protection was not previously available in the art. These and other features, objects and advantages will be understood or apparent to those of ordinary skill in the art from the following detailed description of the preferred embodiments of the invention is as illustrated in the various drawing figures.

BRIEF DESCRIPTION OF THE DRAWINGS

For a better understanding of the nature and objects of the invention, reference should be had to the following detailed description of the preferred embodiments of the invention, taken in conjunction with the accompanying drawings, in which like components are given the same reference numerals in each figure in which they appear, and in which.

DETAILED DESCRIPTION OF THE INVENTION

Figure 1:
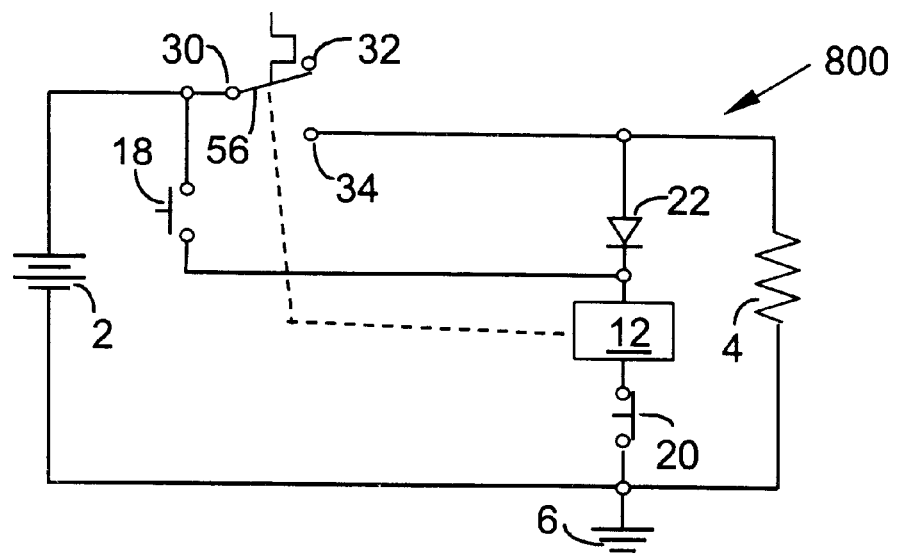
FIG. 1 is an example of the circuit employing a relay having a bimetal wiper in accordance with the principles of the present invention.

FIG. 1 is an example of an embodiment of an overcurrent protection circuit 800 employing a bimetal device including a set of relay contacts comprising a bimetal wiper structure 56. The structure and operation of the relay comprising a bimetal wiper structure will be described in relation to FIG. 2. With the circuit 800 in an OFF state, the bimetal wiper structure 56 in its normal state is against the normally closed contact 32. The circuit 800 is tuned on by momentarily pressing the ON switch 18. Current flows through the relay coil 12, energizing the relay coil 12 and causing the bimetal wiper structure 56 to move to the normally open contact 34. The diode 22 prevents full operating current from flowing from power supply 2 to the load 4 through switch 18, With the ON switch 18 released, current flowing through the bimetal wiper structure 56 to the load 4, and also through the series combination of the diode 22 and the relay coil 12, thereby keeping the relay coil 12 energized. In case of an overcurrent, the bimetal wiper structure 56 heats up and trips to its fault state thereby moving off the normally open contact 34. The relay coil 12 deenergizes and the bimetal wiper structure 56 moves to the normally closed contact 32. Current ceases to flow in the circuit 800, and the bimetal wiper structure 56 cools and returns to its normal state. The tension from the relay spring (67 FIG. 2) keeps the bimetal wiper structure against the normally closed contact 32. The circuit 800 latches in the fault state with no current flowing. The momentary OFF switch 20 is used to turn the circuit OFF under normal operating conditions.

In FIG. 1, both the momentary ON switch 18 and OFF switch 20 are shown as mechanical switches or buttons. However, either or both can be implemented, for example, with solid state devices or by supplying an electrical pulse from an external control unit.

The relays shown in the circuit diagrams in the various figures may also comprise a fusing member 90 within their respective structures to minimize the chance of catastrophic failure due to welding of the relay contacts.

Figure 2:
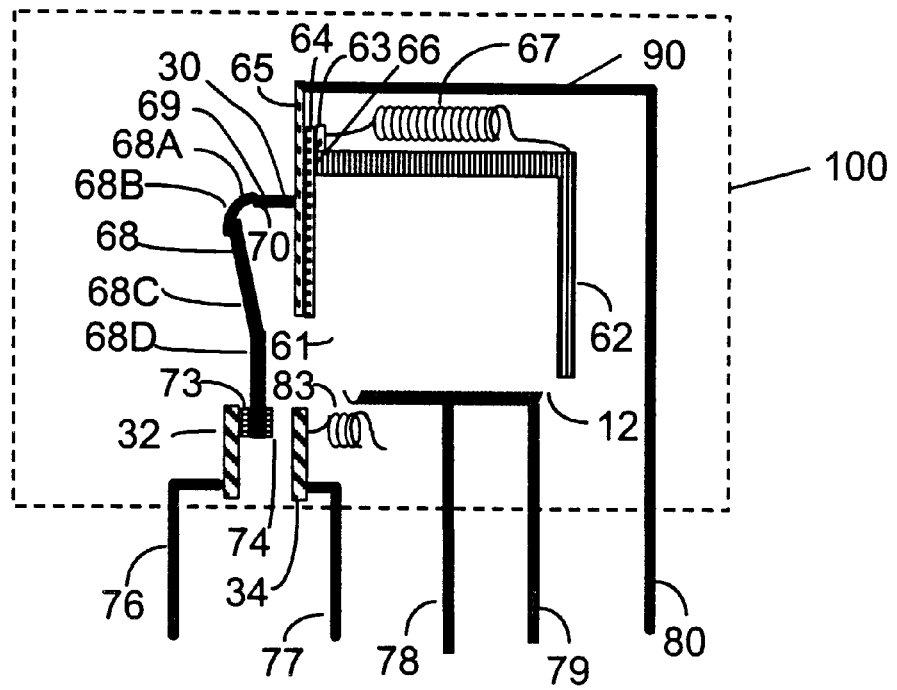
FIG. 2 is an assembly diagram of a relay assembly having a bimetal wiper.

The relay assembly shown in FIG. 2 represents a relay having a bimetal wiper structure 56. The configuration shown is a common relay configuration and is shown merely by way of example and is not intended to be limiting. Since relays are well known in the art, the structure and operation of the relay assembly depicted in FIG. 2 will be described only to the extent necessary to explain the use of a bimetal wiper structure 56. The assembly includes a relay coil 12 and a magnetic core 61 mounted on a first leg of an L-shaped support member 62. A ferromagnetic arm 63 is hinged 66 to a distal end of a second leg of the support member 62. The ferromagnetic arm 63 has a first face which is directed toward an end of the magnetic core 61. An insulating layer 64 is sandwiched between a second face of the ferromagnetic arm 63 and a first face of a wiper support arm 65. A bimetal wiper arm 68 is affixed, e.g. welded, to a second face of the wiper support arm 65. The bimetal wiper arm 68 is comprised of two dissimilar metal layers 69,70. The shape of the bimetal wiper arm 68 will depend on the configuration of the particular relay. As an example, however, the shape of the bimetal wiper arm 68 depicted in FIG. 2 may be generally described in terms of four sections. The first wiper section 68A is a substantially straight section, a first end of which is affixed, e.g. welded, to the wiper support arm 65. The first wiper section 68A is mounted substantially perpendicular to the wiper support arm 65. The second wiper section 68B is arcuate, and traces an arc slightly greater than one quarter circle. The third wiper section 68C is substantially straight. The fourth wiper section 68D is substantially straight, and makes an angle with the third wiper section 68C, which angle is substantially 270 degrees minus the angle traced by the second wiper section 68B. Thus, when the bimetal wiper arm 68 is cool, the fourth wiper section 68D lies in a plane which is substantially parallel with the plane of the wiper support arm 65 thereby accommodating a normally open contact 32 and normally closed contact 34 which are mounted so that they also lie in planes which are substantially parallel with the plane of the wiper support arm 65. In other relay configurations, the shape of the bimetal wiper arm 68 may vary from that described above in order to accommodate the specific requirements of each configuration.

First and second contact pads 73,74 are affixed to either face of a distal end of the bimetal wiper arm 68. The first contact pad 73 is positioned opposite a normally closed contact 32 so that the two are held together in compression when the relay assembly is in a deenergized state (illustrated in FIG. 2), and the second contact pad 74 is positioned opposite a normally open contact 34 so that the two are held together in compression when the relay assembly is in an energized state (not illustrated). The normally closed contact 32 and normally open contact 34 are mounted so that they lie in planes substantially parallel with the wiper support arm 65 (as described above). A first spring 67, having a first end attached to a first end of the ferromagnetic arm 63 and a second end attached to the support structure 62, maintains tension on the first end of the ferromagnetic arm 63 thereby causing the ferromagnetic arm 63 to rotate about the hinge area 66, thereby causing the distal end of the ferromagnetic arm 63 to tend to rotate away from the magnetic core 61, thereby causing the assembly of the ferromagnetic arm 63, wiper support arm 65 and bimetal wiper arm 68 of bimetal wiper structure 56 to tend to rotate toward the normally closed contact 32 thereby bringing the first contact pad 73 in compression contact with the normally closed contact 32.

Figure 3:
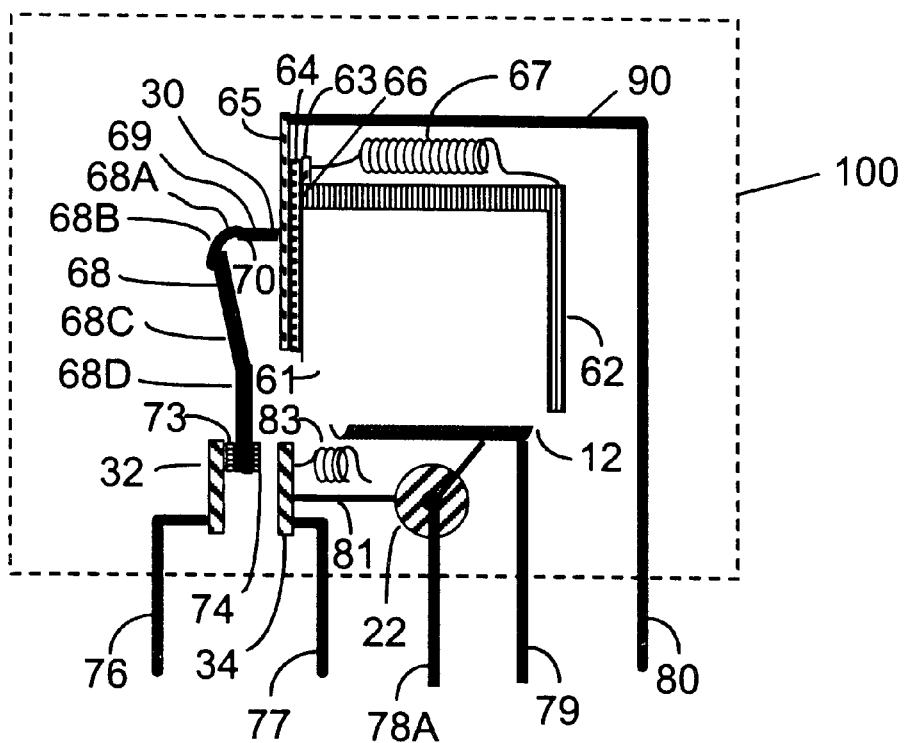
FIG. 3 is an assembly diagram of a relay assembly as depicted in FIG. 2, further including a diode connected as shown in the circuit diagram of FIG. 1.

First and second electrical leads 78,79 connect the relay coil 12 to an external power source (not illustrated) in FIGS. 2 and 3. When power is applied to the relay coil 12, the magnetic core 61 becomes magnetized attracting the ferromagnetic arm 63. The ferromagnetic arm 63 rotates about the hinge 66 with the distal end of the ferromagnetic arm 63 rotating toward the magnetic core 61. The motion of the ferromagnetic arm 63 causes the wiper support arm 65 and bimetallic wiper arm 68 to move in a like manner, thereby breaking the contact between the first contact pad 73 and the normally closed contact 32. The assembly 56 of the ferromagnetic arm 63, wiper support arm 65 and bimetal wiper arm 68 continue to rotate until the ferromagnetic arm 63 rests against the magnetic core 61, and the second contact pad 74 is held in compression contact against the normally open contact 34.

The bimetal wiper arm 68 will retain its shape as long as the current through it is below a predetermined current level and/or the temperature of the bimetal wiper arm 68 is below a predetermined temperature. However, if the current through the bimetal wiper arm 68 should exceed the predetermined current level, thereby causing the temperature of the bimetal wiper arm 68 to exceed the predetermined temperature, then the bimetal wiper arm 68 will change its shape, tending to straighten out, thereby causing the distal end of the bimetal wiper arm 68 to move away from the normally open contact 34, thereby causing the second contact pad 74 to break contact with the normally open contact 34.

In some circumstances heat generated during normal operation of the relay may tend to cause the bimetal wiper arm 68 to heat up and change its shape slightly. If the bimetal wiper arm 68 is in the normally closed position, the tension provided by the first spring 67 will keep the first contact pad 73 held in compression against the normally closed contact 32. A second spring 83 is used to insure that the second contact pad 74 is held in compression against the normally open contact 34 with the relay in the energized position. A first end of the second spring 83 is fixed to the normally open contact 34. A second end of the second spring 83 is attached to an insulated mount (not illustrated) with in the relay assembly. The second spring 83 urges (tension or compression depending on how the second spring is mounted) the normally open contact 34 toward the wiper assembly, thereby assuring a good compression contact between the second contact pad 74 and the normally open contact 34 when the relay is energized. Although the second spring 83 is depicted as a coil spring, other suitable springs, e.g. leaf, may be used. Moreover, rather than attach a contact to a separate spring, the contact itself can be a spring, e.g. leaf, coil, etc., and thereby keep in compression contact with the wiper assembly.

FIG. 2 and the above description depict a relay assembly having a bimetal wiper configured to break contact with a normally open contact upon an overcurrent through the bimetal wiper. This is intended solely to be by way of example, and should not be interpreted as so limiting. Relay assemblies employing the bimetal wiper of the invention may be configured to have a wiper break contact with a normally closed contact, a normally open contact, or with whichever relay contact the wiper is making contact upon an overcurrent through the bimetal wiper.

The circuit depicted in FIG. 1 employs the relay assembly depicted in FIG. 2 to advantage by placing the relay coil 12 in the current path which includes the wiper structure 56. Thus, when the bimetal wiper structure 56 breaks contact with the normally open contact 34, the relay coil 12 immediately deenergizes, causing the bimetal wiper structure 56 to move back to the normally closed contact 34, and to remain there until the relay coil 12 is again energized. The relay assembly shown in FIG. 3 is the relay assembly shown in FIG. 2 with a diode 22 included in the assembly. The second electrical lead 78A is connected to the diode 22 (anode side illustrated) and the relay coil 12, and a contact lead 81 connects the diode 22 (cathode side illustrated) with the normally open contact 34, Thus, the key components of the circuit protection arrangement of FIG. 1, including the relay coil 12, contacts 30,32,34, bimetal wiper structure 56, and diode 22 can be conveniently combined in a single relay package 100. As seen in FIG. 3, connection leads 76,77, 78A,79, and 80 extend outwardly of the package 100 to enable suitable electrical connections to be made, such as shown in FIG. 1.

Figure 4:
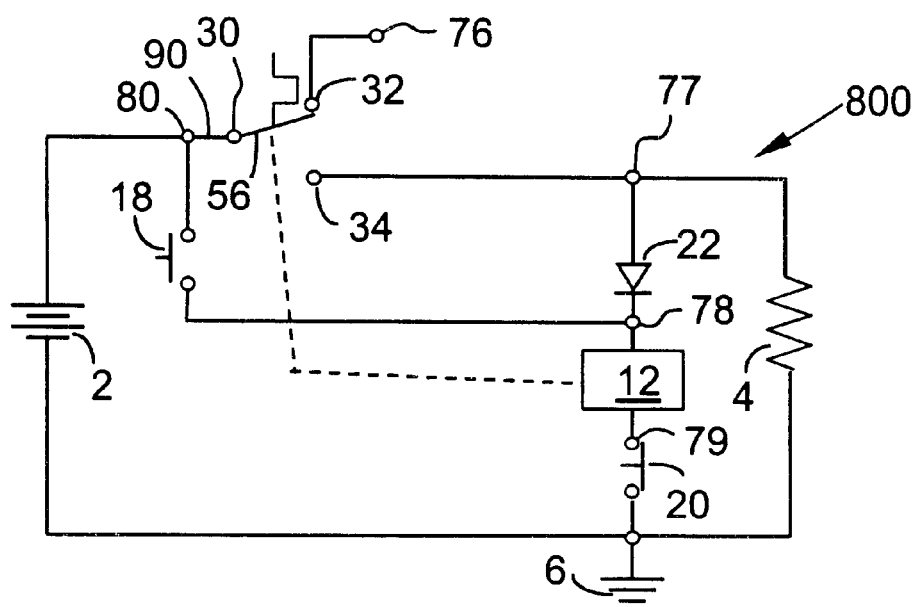
FIG. 4 is a circuit diagram of a circuit employing a relay assembly as depicted in FIG. 2.
Figure 5:
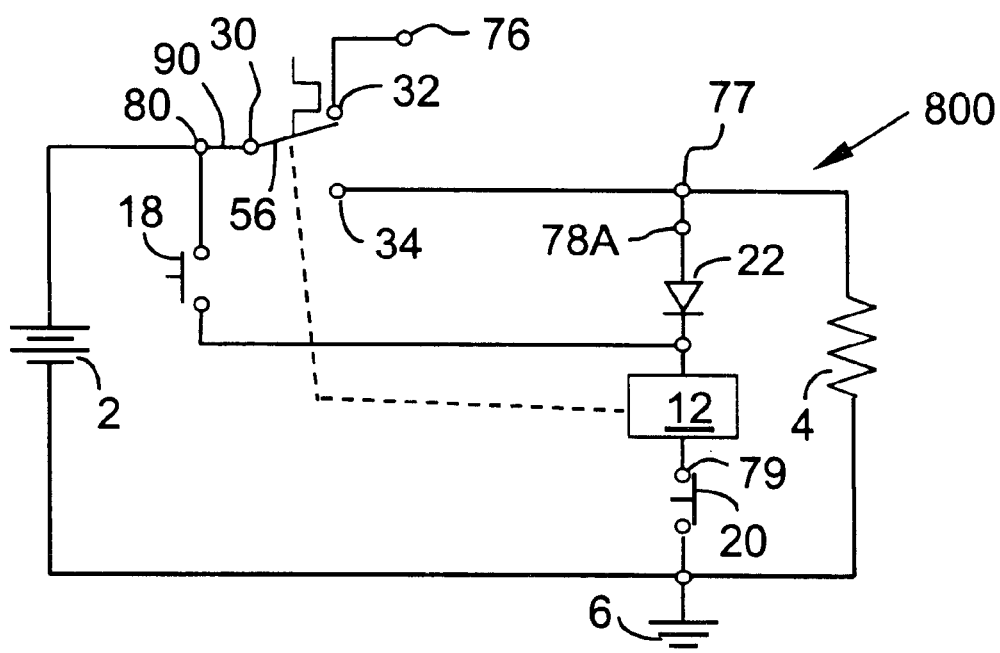
FIG. 5 is a circuit diagram of a circuit employing a relay assembly as depicted in FIG. 3.

FIGS. 4 and 5 show the electrical connecting made in a circuit for the relay assemblies of FIG. 2 and FIG. 3, respectively.

What is claimed is:

1. An electrical protection device having relay contacts in series between an electrical power supply and an electrical power load to form an operating circuit, the operating circuit having an on state and an off state and comprising a current carrying line and a return line between the electrical power supply and the electrical load, the electrical protection device for protecting the operating circuit from overcurrent and having a relay coil connected in parallel across the electrical power supply in the on state, the protection device comprising a single relay package including:

a frame, the relay coil mounted to the frame, an armature pivotally mounted to the frame and mechanically actuated from a normally closed contact position to a normally open contact position when the coil is energized, a bimetallic wiper mounted to the armature, the contacts including a wiper contact mounted to the bimetallic wiper and a normally open contact, a diode connected in series with the relay coil and the normally open contact to pass coil energizing current to the coil from the electrical power supply during the on state and to prevent backflow of coil energizing current to reach the electrical power load when power is first applied to the coil, a first coil lead connected to the relay coil and a second coil lead connected to an anode of the diode, a first contact lead being connected to the wiper contact, and a second contact lead being connected to the normally open contact, such that in the on state the relay coil is connected to the electrical power supply through the diode and causes the wiper contact to connect to the normally open contact so that the current carrying line connects the electrical power supply to the electrical power load through the first contact lead and the second contact lead, the bimetallic wiper being responsive to an overcurrent in the power supply path by changing shape and moving the wiper contact out of connection with the normally open contact thereby placing the operating circuit in the off state.

2. The electrical protection device set forth in claim 1 wherein the operating circuit includes a momentary make switch means for momentarily applying energizing current directly to the relay coil.

3. The electrical protection device set forth in claim 1 wherein the operating circuit includes a momentary break switch means for momentarily breaking current flow to the relay coil.

4. The electrical protection device set forth in claim 1 wherein the armature comprises an arm of ferromagnetic material pivotally mounted to the frame and being biased by a bias spring to the normally closed position.

5. The electrical protection device set forth in claim 1 wherein the bimetallic wiper is comprised of two dissimilar metal layers formed to have a first straight section affixed to the armature, a second arcuate section generally following an arc slightly greater than one quarter circle, a third substantially straight section, and a fourth wiper substantially straight section supporting at a distal end the wiper contact and forming an angle with the third wiper section which is substantially 270 degrees minus the angle traced by the second wiper section.

6. The electrical protection device set forth in claim 5 wherein the bimetallic wiper tends to straighten out in response to an overcurrent and thereby cause the wiper contact to move away from the normally open contact.

7. The electrical protection device set forth in claim 1 further comprising a normally closed contact oppositely facing the normally open contact and which is connected to the wiper contact when the operating circuit is in the off state.

8. The electrical protection device set forth in claim 1 wherein the bimetallic wiper structure includes a fusing member for opening to minimize catastrophic failure due to welding together of said wiper contact and said normally open contact.

* * * * *